(12) United States Patent
Clark

(10) Patent No.: US 6,742,705 B1
(45) Date of Patent: Jun. 1, 2004

(54) DATA COLLECTION SYSTEM

(75) Inventor: Brett G. Clark, Whites Creek, TN (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/429,641

(22) Filed: Oct. 29, 1999

(51) Int. Cl.$^7$ .............................................. G06F 17/60
(52) U.S. Cl. ................. 235/385; 375/454; 375/462.01; 385/95
(58) Field of Search ................. 235/375, 385, 235/462.01, 462.13, 454, 494, 462.45, 462.46, 472.01, 472.02; 265/378; 101/35; 385/95, 106, 134, 99; 700/117

(56) References Cited

U.S. PATENT DOCUMENTS

| | | |
|---|---|---|
| 4,586,610 A | 5/1986 | Gandolfo |
| 4,636,271 A | 1/1987 | Gandolfo |
| 4,655,129 A | 4/1987 | Wirth et al. |
| 4,717,233 A | 1/1988 | Szkaradnik |
| 4,889,977 A * | 12/1989 | Haydon ...................... 235/375 |
| 5,009,474 A | 4/1991 | Wurmser et al. |
| 5,119,464 A | 6/1992 | Freychet et al. |
| 5,268,983 A | 12/1993 | Tatarka et al. |
| 5,386,490 A | 1/1995 | Pan et al. |
| 5,481,100 A | 1/1996 | Terauchi |
| 5,506,876 A | 4/1996 | Homer |
| 5,621,864 A | 4/1997 | Benade et al. |
| 5,706,380 A | 1/1998 | Le Noane et al. |
| 5,747,785 A * | 5/1998 | Miller et al. ............ 235/472.01 |
| 5,821,510 A * | 10/1998 | Cohen et al. ................ 235/375 |
| 5,970,749 A | 10/1999 | Bloom |
| 6,206,583 B1 * | 3/2001 | Hishikawa et al. ............ 385/96 |
| 6,232,870 B1 * | 5/2001 | Garber et al. ............ 235/385 X |
| 6,282,353 B1 * | 8/2001 | Clark .......................... 385/99 |
| 6,341,242 B1 * | 1/2002 | Mahmood et al. .......... 700/117 |

FOREIGN PATENT DOCUMENTS

| | | | |
|---|---|---|---|
| JP | 4-101107 A | * | 4/1992 |
| JP | 10-282358 A | * | 10/1998 |
| JP | 11-119067 A | | 4/1999 |
| JP | 11-119067 | | 4/1999 |
| JP | 2000-47072 A | | 2/2000 |

OTHER PUBLICATIONS

PCT International Search Report, PCT/US00/29845 Apr. 2001.

* cited by examiner

*Primary Examiner*—Jared J. Fureman

(57) ABSTRACT

A data collection system that is attachable to an optical fiber splicer and is connectible to the splicer's serial port and/or video output. The device captures text data from the serial port and stores this data along with digitized video images of the fibers before, during, and/or after the splice. This data may be stored on a high-capacity storage medium, which may be removable. The date, time, and/or other external data may be recorded as well. The record of each splice is uniquely identified by a serial number or other indicium that is labeled on the splice. This serial number may be read into the data collection device by a laser scanner or optical wand. This device may also interface with a computer and may have full handshaking and a faster, better configured serial port connection than the splicer itself. Advantages of the data collection system include providing remote access of splice data, accountability for defective or problematic splices, and more efficient troubleshooting.

3 Claims, 10 Drawing Sheets

| INDICIUM (SPLICE NO.) | IMAGE DATA | ESTIMATED LOSS (DB) | CLEAVE ANGLES (DEG) | SPLICE PROGRAM | DATE/TIME OF MANUFACTURE | OPERATOR | SPLICER NO. | INTALLED LOCATION | CROSS-REFERENCE |
|---|---|---|---|---|---|---|---|---|---|
| 31B04 |  | 0.07 | 0.14 / 0.25 | 1 | 2/25/99 11:31 AM | JONES | 2 | 103-A1-B22 | 31B05, 31B06 |
| 31B05 201 |  | 0.09 | 0.21 / 0.32 | 1 | 2/25/99 11:53 AM | JONES | 2 | 103-A1-B23 | 31B04, 31B06 |
| 23A17 |  | 0.06 | 0.48 / 0.12 | 4 | 1/15/99 2:47 PM | SMITH | 1 | 115-A7-103 | 23A15, 23A16, 23A18 |
| 72W42 |  | 0.09 | 0.17 / 0.63 | 2 | 12/14/98 1:14 PM | DOE | 3 | 112-A3-72 | 72W40, 72W41, 72W43, 72W44 |

DATA COLLECTION SYSTEM

FIELD OF THE INVENTION

The present invention is directed generally to optical fiber splicing, and particularly to an apparatus for use with an optical fiber splicer and for capturing and retrieving data associated with a splice.

BACKGROUND

Many optical fiber systems today require splicing of optical fiber segments. Such splicing is conventionally achieved in many ways, such as using mechanical splices or fusion splices.

When manufacturing a fusion splice, it is important that the two fiber ends that are to be fused together are precisely aligned with each other. Although in practice some misalignment cannot always be avoided, any significant misalignment may cause an unacceptably high optical loss to be provided by the splice. Further optical loss and other defects may also be incurred due to other problems with the manufacturing of a fusion splice, such as an incorrect fusing temperature, an incorrect duration of the fusion, and an unclean work area where the splice is made (e.g., foreign particles from the air that are absorbed into the fused area may increase the optical loss).

Once a splice is manufactured and installed in an optical fiber system (e.g., an optical fiber network), it may be desirable to know certain information about the splice, such as the optical loss produced by the splice, the cleave angle of the splice, and generally the quality of the splice and other manufacturing-related information. It would be desirable to have access to such information in order to provide accountability as to the source of a particular splice and/or as to the cause of a possible defect in a particular splice. Such accountability would reduce the cost and time required to discover specific problems with a manufacturing process and/or installation process and to reduce or eliminate such problems. Such accountability of splice source and quality would also be useful since splice operators are often rated on the quality of splices that the operators manufacture.

Unfortunately, there are not presently available any methods or apparatus for collecting and storing information associated with splices (splice data), or for providing access to splice data, in order to determine particular splice characteristics and to trace back the source of the manufactured splice. Should a splicer operator not perform his or her job properly, or should an otherwise acceptable splice be later sabotaged or otherwise damaged, there is presently no satisfactory way to determine the manufacturing source of the splice, or whether a particular splice was manufactured properly but was later sabotaged or damaged after the manufacturing process. Accordingly, there is a need for an apparatus and method for providing accountability as to the manufacturing source and quality of individual splices.

One reason that no such systems presently exist is that splices currently are not uniquely identifiable. In other words, splices currently are not associated with a unique identifier or indicium (such as a serial number). Although some optical fiber cables have been uniquely identified, splices are not. However, without providing unique identification of splices, it would be nearly impossible to store splice data in such a way as to provide the desired accountability discussed above. Accordingly, there is a need for the unique identification of splices.

SUMMARY OF THE INVENTION

Various aspects of the present invention solve at least the problems described above. For example, according to aspects of the present invention, a data collection system may be used for collecting and storing splice data associated with splices. The data collection system may be connectible to a splicer such that data associated with the manufacture of the splice can be transferred to the data collection system for storage, analysis, and later retrieval. Splice data that may be transferred to and stored by the data collection system (and/or generated by the data collection system) may include, but is not limited to, an indicium (such as a serial number or other identifying data) that uniquely or semi-uniquely identifies the splice, the splice program used to create the splice, the date and/or time of manufacture of the splice, the place that the splice was manufactured, the splice type, the fusion temperature used to create the splice, the fusion time, the operator's identity, the identity of the splicer, the anticipated or actual installation location of the splice in an optical fiber system, an image of the splice, and/or any cross-referenced splice indicia may be provided via the input device.

Once the splice data is stored and appropriately organized by the data collection system, the splice data may be later retrieved for the purposes of providing accountability as to the source of the manufactured splice.

Accountability is facilitated when each splice has an associated splice indicium that uniquely or semi-uniquely identifies the splice. The splice indicium may be or include, e.g., text numbers, alphanumeric text, a symbol combination, bar coding, a pattern, graphics, a shape, a picture, an image, a holographic image, braille, a signature, a trademark, a color or color combination, a marking, an engraving and/or relief, an icon, a texture, and/or data within a memory of an electronic memory-device such as a microchip. According to aspects of the present invention, each splice may have a label on which the splice indicium is printed. What is important is that the splice indicium identify each particular splice having such splice indicia, either uniquely (i.e., completely unique amongst all splices) or semi-uniquely (i.e., unique within a particular group or sub-group of splices).

Accordingly, some aspects of the present invention are directed to an apparatus for receiving splice data for each of a plurality of optical fiber splices, each of the plurality of optical fiber splices being uniquely identified by at least one of a plurality of splice indicia, the apparatus comprising a data interface for receiving the splice data, and a data storage device coupled with the data interface, for receiving the splice data and the splice indicia from the data interface and for storing the splice data and the splice indicia.

Further aspects of the present invention are directed to an apparatus for selecting splice data for an optical fiber splice based on a selected splice indicium from a plurality of unique splice indicia, the selected splice indicium uniquely identifying the optical fiber splice, the apparatus comprising a input data interface for receiving the selected splice indicium; a data storage device coupled with the input data interface for storing the splice data and the plurality of splice indicia; a processor coupled with the data storage device for retrieving from the data storage device the splice data associated with the selected splice indicium; and an output data interface for outputting the splice data.

Still further aspects of the present invention are directed to a method for storing splice data and splice indicia associated with optical fiber splices, the method comprising the steps of splicing a plurality of optical fiber portions together to create a plurality of optical fiber splices; generating splice data for each of the optical fiber splices; assigning each of the optical fiber splices a splice indicium from a plurality of unique splice indicia; and storing the splice data and the splice indicia in a storage device.

Still further aspects of the present invention are directed to a method for retrieving splice data for an optical fiber splice based on a selected splice indicium from a plurality of unique splice indicia, the selected splice indicium uniquely identifying the optical fiber splice, the method comprising the steps of selecting the selected splice indicium; inputting the selected splice indicium to an input device; retrieving from a storage device coupled to the input device the splice data associated with the selected splice indicium; and outputting data representing the splice data.

Still further aspects of the present invention are directed to an optical fiber splice comprising a first optical fiber segment and a second optical fiber segment, the first and second optical fiber segments being coupled together for optical communication therebetween at a splice location within the splice; and an indicium for uniquely identifying the optical fiber splice.

Still further aspects of the present invention are directed to a method for manufacturing an optical fiber splice, the method comprising the steps of splicing optical fiber portions together at a splice location to create the optical fiber splice; and labeling the optical fiber splice with an indicium that uniquely identifies the optical fiber splice.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in optical fiber technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with three-digit reference numbers, wherein the first digit of a reference number indicates the drawing number in which the element is first illustrated. The same reference number in different drawings refers to the same element.

DETAILED DESCRIPTION OF PREFERRED EMBODIMENTS

Figure 1:
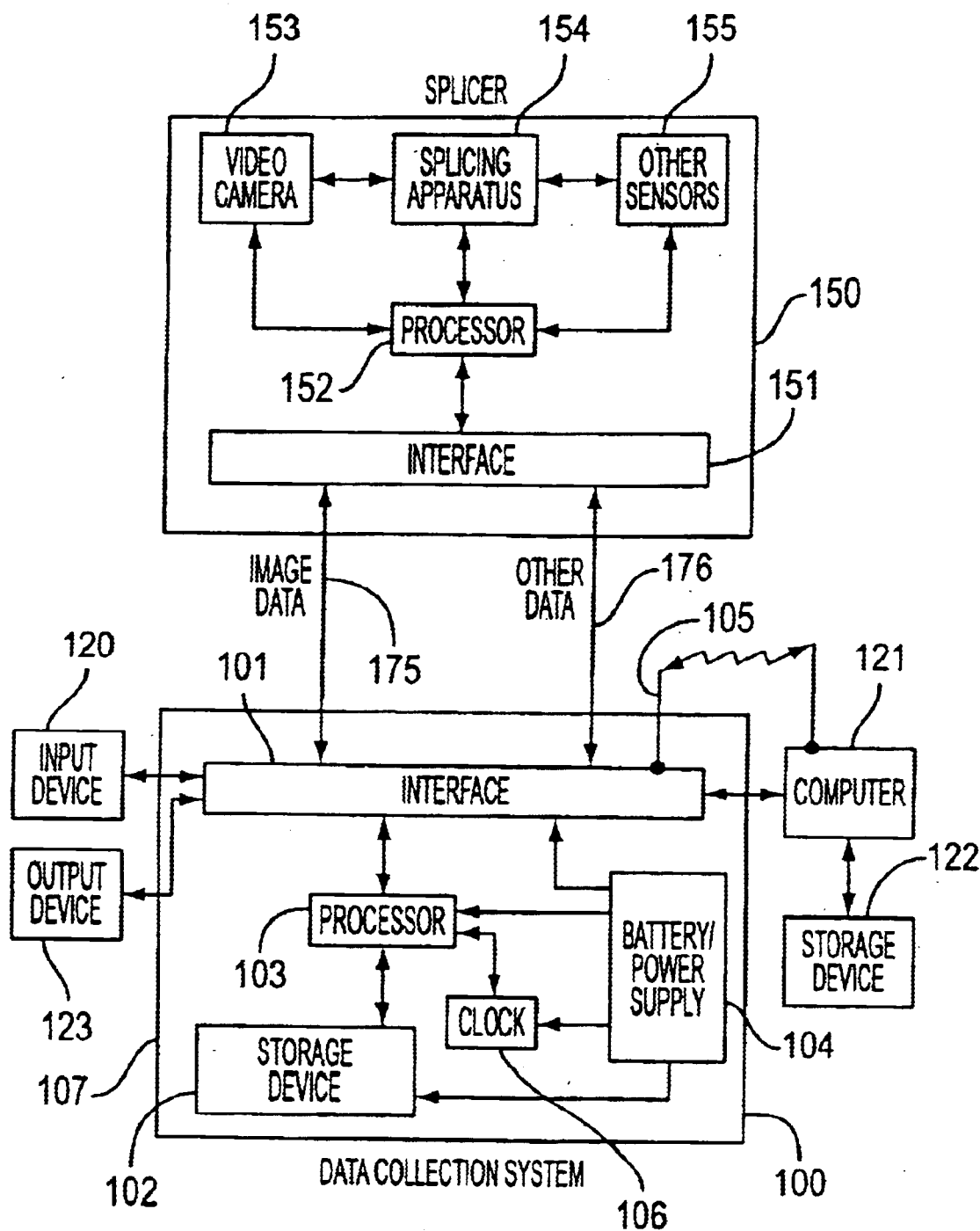
FIG. 1 is a schematic illustration of a first exemplary embodiment of a data collection system according to aspects of the present invention.

Referring to FIG. 1, an exemplary embodiment of a data collection system 100 according to aspects of the present invention is shown to be connected to a splicer 150. The data collection system 100 preferably includes a data interface 101 for receiving and/or transmitting data, a data storage device 102 for storing data, a processor 103 for controlling data flow, controlling the selection, retrieval, and/or storage of data, and/or controlling various operations of the data collection system 100, a battery/power source 104 for supplying power to the various portions of the data collection system 100, an antenna 105 or other wireless interface, a clock 106, an input device 120, and/or an output device 123. The data collection system 100 may be fully or partially encased in a housing 107.

The splicer 150 may include an interface 151, a processor 152, a video camera 153 and/or other video input device, splicing apparatus 154 for splicing optical fiber cables, and/or other sensors 155 for determining information concerning a splice, such as optical loss of the splice.

The data interface 101 of the data collection system may be permanently connected, or removably connectible, with the interface 151 of the splicer, an input device 120, and/or a computer 121. The various connections to the data interface 101 of the data collection system may be in any physical format (e.g., electrical, optical, wireless, etc.) and data format (e.g., digital, analog, serial, parallel, framed, packetized, synchronous, asynchronous, etc.). In one embodiment, the data collection system 100 may include a splicer input interface and connected to the splicer 150 as shown in FIG. 1. There may be one or more signal connections between the data collection system 100 and the splicer 150. In the embodiment shown in FIG. 1, two signal connections 175, 176 are used, one for transferring image data associated with a video image of a splice, and the other for transferring other data (e.g., text and/or numerical data) associated with the splice. However, a single signal connection for transferring both the image data and any other data, or any other combination of signal connections, may be used.

The data storage device 102 may be any type of data storage device and may include any permanent and/or removably connectible storage medium (wherein data is stored on the removable storage medium). For example, the data storage device 102 may include a magnetic and/or optical disk drive, a magnetic and/or optical hard drive, a ZIP drive, a magnetic tape drive, memory (e.g., a random-access memory), a removable memory card, a video cassette recorder, and/or any other data storage device and/or medium appropriate for storing data.

The processor 103 may be embodied in any form, and may include one or more central processing units, computers, controllers, and/or any other dedicated or non-dedicated circuitry or other device for controlling data flow, controlling the selection, retrieval, and/or storage of data, and/or controlling various operations of the data collection system 100. The processor 103 may preferably be configured to select portions of splice data related to splice indicia.

The battery/power source 104 may include a permanent or replaceable battery or bank of batteries a rechargeable or non-rechargeable battery or bank of batteries, a solar array, and/or any other device for storing and supplying power.

The input device 120 may include a button, keyboard/keypad, mouse, light pen, digitizer, optical scanner, optical wand, electromagnetic probe/wand, bar code reader, optical character recognizer, voice recognition device, microphone, touch-sensitive pad, video camera, video image recognizer, and/or any other automatic and/or manual input device appropriate for reading and/or receiving a splice-identifying splice indicium. The input device 120 may also be used by an operator/user for controlling operations of the data collection system 100. One or more of the input devices 120 may be coupled to the interface 101 of the data collection system 100.

The computer 121 may be may include one or more central processing units, computers, controllers, and/or any other dedicated or non-dedicated circuitry or other computing device. The computer 121 may further include and/or may be connected to a data storage device 122. The data storage device 122 may include a magnetic and/or optical disk drive, a magnetic and/or optical hard drive, a ZIP drive, a magnetic tape drive, memory (e.g., a random-access memory), a video cassette recorder, and/or any other data storage device and/or medium appropriate for storing data. The data storage device 122 may store any or all of the information that may be stored in the data storage device 102 of the data collection system.

The output device 123 may be any device suitable for presenting data and/or other information to a user and/or to another device such as a computer. For example, the output device 123 may include a display (such as an LED display, an LCD display, a television screen, a video monitor, a fluorescent display, and/or a plasma display), a speaker, a piezoelectric audio output device, an electrical data output port and/or interface, an optical data output port and/or interface, and/or an electromagnetic wave data output port and/or interface with an antenna. One or more output devices 123 may be coupled to the interface 101 of the data collection system 100.

In operation, the data collection system 100 may be used to collect splice data associated with splices. According to one embodiment of a method for collecting and/or using splice data, an operator or user may connect the data collection system 100 to the splicer 150. Splicers currently exist that collect and provide various forms of splice data For example, the Ericsson FSU925PMA splicer has a serial port and a video output port for providing various data related to the manufacture of a splice.

The user may select a particular splice program for the splicer 150 to follow, create a splice of an optical fiber cable using the splicer 150, and manually or automatically take measurements of the splice to determine whether the splice meets certain quality standards. Such measurements may be taken immediately before, during, and/or immediately after the splice is created. For example, the splicer 150 may generate an image (such as a video image) of the splice immediately after the fusing of the optical fiber cables using a video camera 153. The image may be a still or a moving image and may be, e.g., about 1 MByte of image data per splice. Preferably, and in order to obtain the most information from the image, the image may be taken while the fusion point is still hot An advantage of creating and storing the image data is that such an image often will show whether there is dirt or other foreign particles in the splice (caused, e.g., by a dirty work area) that could cause optical loss and other problems with the splice. It cannot be determined from the estimated loss alone whether such foreign particles exist in a splice. Further, the splicer 150 may determine characteristics of the splice such as the estimated optical loss of the splice and/or the cleave angle of the splice using the video camera 153 and/or other sensors 155.

If it is determined that the splice does not meet quality standards, the splice may be discarded, and a new splice may be created and measured as described above. If the splice meets quality standards, the measurements taken and/or any other splice data may be transferred to the data collection system 100. Alternatively, the measurements and any other splice data may be always sent to the data collection system 100, whereupon the data collection system may discard or store separately the data associated with a splice that is determined not to meet quality standards.

The splicer 150 may transfer splice data (e.g., all or part of the image data, the estimated loss, and/or the cleave angle of the splice) to the data collection system 100 via the signal connections 175, 176 and received by the data interface 101. The splice data may be in any data format and may be analog and/or digital. For example, the data collection system 100 may receive ASCII text data from the splicer 150 in RS-232 serial format, and video data from the splicer 150 in MPEG format or other standard video format.

Additional splice data may be provided via the input device 120. For example, a splice indicium that uniquely identifies the splice, the splice program used to create the splice, the date and/or time of manufacture of the splice, the place that the splice was manufactured, the splice type (which may be defined by the splice program), the fusion temperature used to create the splice (which may also be defined by the splice program), the fusion time (which may also be defined by the splice program), the operator's identity, the identity of the splicer 150 or the splicing apparatus 154, the anticipated installation location of the splice in an optical fiber system ("installed location"), the customer for whom the splice was created or installed, and/or any cross-referenced splice indicia may be provided via the input device 120. In some embodiments of the present invention, the input device 120 may include a bar code reader, wherein the manufactured splice may have a label with bar coding that uniquely or semi-uniquely identifies the splice (as discussed in more detail below), and the bar coding may be read using the bar code reader and stored in the data storage device 102.

Additionally or alternatively, some or all of the splice data may be provided automatically from the splicer 150 via the signal connections 175, 176. Further, the date and/or time of manufacture may be automatically provided by the clock 106 in the data collection system 100 (and/or in the splicer 150).

Any or all of the above-described splice data may be transferred to the data storage device 102, the computer 121, the data storage device 122 via the computer 121, and/or the output device 123 for viewing by the operator. Transferring of splice data between the data collection system 100 and the computer 121 may allow for full handshaking and a faster, better-configured connection (e.g., a serial port connection) than with the splicer 150. Accordingly, the splicer 150 may alternatively be connected to the data collection system 100 via the computer 121.

The operator may manipulate some or all of the splice data and/or the operations of the data collection system 100 and/or the splicer 150 using the input device 120. Further, any or all of the splice data may be selectively and/or automatically deleted, archived to long-term storage, and/or transferred between the data collection system 100 and another device such as a computer, and/or between the data collection system 100 and another data collection system.

Upon receiving some or all of the splice data, the data storage device 102 and/or 122 may store the splice data in any format suitable for convenient retrieval at a later time. As it would be useful to retrieve splice data for a particular splice, it is preferable to associate the splice data with the particular splice to which the data belongs. For example, for each splice, the data storage device may store the splice data and the splice indicium in a unique data record. Further, the data storage device may index the splice data by splice indicium, and/or a database having access to the data storage device may be configured to access splice data according to splice indicium.

Figure 2:
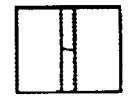
FIG. 2 is a chart of an exemplary set of data that may be stored according to aspects of the present invention.
Figure 2:
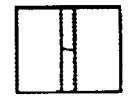
Figure 2:
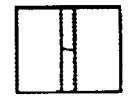
Figure 2:
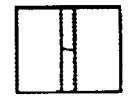

One exemplary embodiment of how splice data may be organized in the data storage device 102 and/or 122 is shown in FIG. 2. The table in FIG. 2 represents one way to organize and index data in the data storage device 102 and/or 122. There are many ways to organize the splice data in order to be conveniently retrievable, depending upon the user's desires and the storage capacity of the data storage device. For example, the data categories (represented by the separate columns of splice data in the table) shown in FIG. 2 may be stored in a different order, there may be some data categories omitted, and/or there may be additional data categories. In some embodiments, the splice data may be stored and indexed using a database application. As can be seen in FIG. 2, the data within the various categories of splice data are indexed by splice indicium. For example, splice no. 31B05 (an example of an alphanumeric text indicium wherein any of the digits may be a number or a letter) has an associated image data 201, estimated loss of 0.09 dB, cleave angles of 0.21 and 0.32 degrees, and date/time of manufacture of Feb. 25, 1999 at 11:53 am. One may also determine from the data as stored in the data storage device and as shown in FIG. 2 that splice no. 31B05 was created by operator Jones and is installed at location 103-A1-B23. Of course, any of the splice data shown in the table of FIG. 2 (and stored in the data storage device 102) may be in any format as is convenient or necessary.

Some or all of the splice data may be partitioned within the data storage device 102 and/or 122 to separate splice data associated with one optical fiber system from splice data associated with another optical fiber system. Further, some or all of the splice data may be encrypted and/or secured such that the secured splice data is retrievable only upon entry of an authorization code. There may be a different authorization code for each partition. In this way, certain data may be accessible only by authorized users. This may be required for some governmental uses and by some customers.

Figure 3:
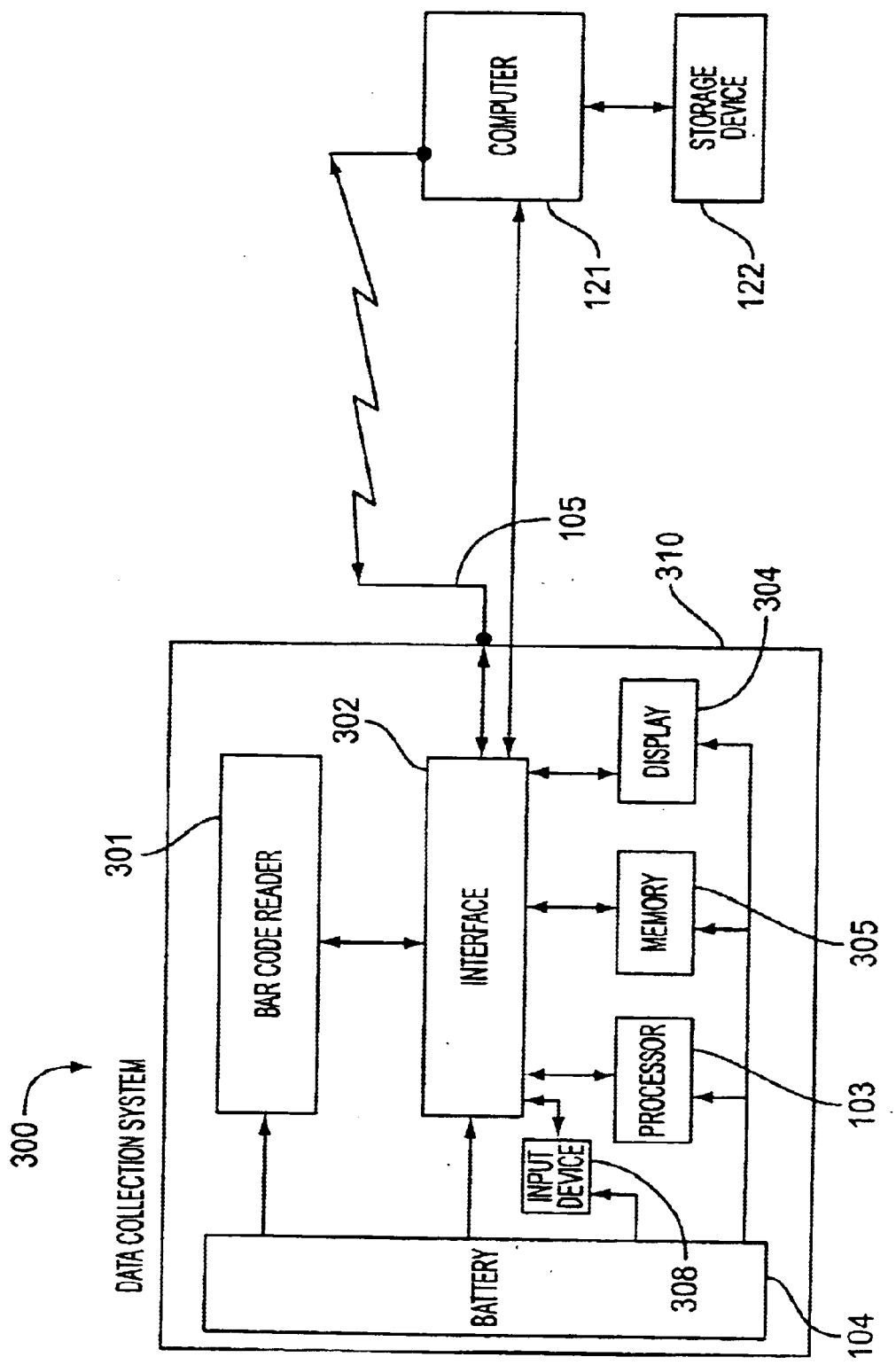
FIG. 3 is a schematic illustration of another exemplary embodiment of a data collection system according to aspects of the present invention.

FIG. 3 illustrates an alternative embodiment of a data collection system 300. The data collection system 300 may include a bar code reader 301 (and/or any other input device such as the input device 120), a data interface 302, an antenna 105 (and/or other wireless interface), a display 304, a memory 305 (e.g., one or more memory chips such as a RAM, and/or any other data storage device), a processor 103, a battery/power source 104, and/or an input device 308. The data collection system 300 may be partially or fully encased in a housing 310. Preferably, the data collection system 300 is made to be portable enough to be hand-carried by a person. For example, it would be preferable to manufacture the data collection system 300 to be no more than, e.g., five pounds, and/or no more than the volume of a standard laptop personal computer. Ideally, the data collection system 300 may be made small enough to be suitable as a hand held device.

As will be described below, this embodiment of the data collection system 300 may be used instead of, or in conjunction with, the data collection system 106. The embodiment of the data collection system 300 as shown in FIG. 3 is even more portable than the embodiment of the data collection system 100 shown in FIG. 1. It may be desirable in some instances to have a data collection system 300 that is portable enough to carry on site (e.g., hand carried by a technician when visiting an optical fiber system site).

The exemplary data collection system 300 may thus include the memory 305 instead of a relatively heavy or bulky high-capacity data storage device of another type. In such a case, splice data and/or other data may be stored in and/or retrieved from the data storage device 122. This allows a user of the data collection system 300 to work remotely (e.g., on site at an optical fiber system installation) from the bulk storage of data to which the user may need access. The data collection system 300 may be configured to selectably download into the memory 305 from the data storage device 122 only that portion of the splice data that is anticipated to be needed for a particular day and/or location. For example, prior to visiting a particular optical fiber system site, the technician may download only the splice data that is associated with splices in that particular optical fiber system. Thus, the memory 305 does not need to be large enough to hold all splice data, thereby allowing the data collection system 300 to be relatively small and lightweight In such sub-embodiments, the data interface 302 may include an external storage device interface configured to receive at least a portion of the splice data and the splice indicia from the storage device 122, and such splice data and splice indicia may be transferred to the memory 305.

Further, a user of the data collection system 300 may enter additional data using the input device 308 while on site and store that additional data in the memory 305 for later processing and/or permanent storage. For example, the user that works with the particular optical fiber system mentioned above may enter additional data associated with one or more particular splices, and that data may be later or immediately uploaded to the computer 121 and/or data storage device 121. Such uploading of data, downloading of data, data retrieval, and/or other communications with external devices may be accomplished via the antenna 105 and/or via any other wired and/or wireless connection. If the antenna 105 is used, the data collection system 300 (or 100) and the computer 121 may be in communication with a cellular telephone and/or pager network. In such a case, data may be transferred over the cellular network. Additionally or alternatively, a simple radio frequency transmission may be used directly between the data collection system 300 (or 100) and the computer 121.

The data interface 302 may be configured to receive and/or send data. For example, the data interface 302 may include an input data interface for receiving splice indicia, and/or an output data interface for outputting a selected portion of splice data Further, the data interface 302 may include any other configuration of data interface such as an electronic memory device input interface (which may be connectible to an electromagnetic probe) for reading splice indicia from the memory of an electronic memory device, as further described below. Further, the data interface 302 may include a data port for outputting data representing splice data.

As discussed above, any of the embodiments of the data collection system 100, 300 of the present invention may be used for collecting and accessing splice data. The splice data preferably is indexed by splice numbers or other splice indicia. As will be discussed below with reference to FIGS. 4–10, each splice (or group of splices) may be uniquely associated with a splice indicium. It is desirable to physically label each splice with its associated splice indicium so that each splice may be easily identified by sight and/or using a label-reading device.

In operation, the data collection system 300 may be used to selectively retrieve splice data associated with a particular splice. A user of the data collection system 300 may input a selected splice indicium that uniquely identifies that particular splice (e.g., using a keypad, the bar code reader 301, or any other input device 308. The processor 103 may access the memory 305 and/or the storage device 122 to retrieve splice data therefrom that is associated with the splice indicium (e.g., splice data that is in the same data record as the splice indicium). For example, a user may use the bar code reader 301 to scan in the splice indicium "31B05." Responsive to splice indicium 31B05 being scanned in, splice indicium 31B05 may be sent through the interface 302 to the processor 103 in the data collection system 300. The processor 103 may access the memory 305 and/or the storage device 122 to retrieve the splice data associated with splice indicium 31B05. Referring to FIG. 2, that splice data that is retrieved may include, e.g., image data 201, an estimated optical loss of 0.09 dB, cleave angles of 0.21 and 0.32 degrees, a splice program of 1, a date/time of manufacture of Feb. 25, 1999 at 11:53 a.m., an operator of Jones, a splicer number of 2, an installed location of 103-A1-B23, and a cross reference of splice indicia 31B04 and 31B06.

Upon retrieval of the splice data associated with the selected splice indicium, the data collection system 300 may display via the display 304, or otherwise output, some or all of the retrieved splice data. Multiple splice indicia may also be entered and processed in the same way.

Although the above description of operation is discussed with regard to the data collection system 300, the same operations may also be performed using the data collection system 100 of FIG. 1. Alternatively, the data collection system 100 and the data collection system 300 may be used together. In such an arrangement, the data collection system 100 may be used for the collection of splice data from the splicer 150, and the data collection system 300 may be used for the selective retrieval of splice data according to a selected splice indicium. To allow the splice data collected by the data collection system 100 to be used by the data collection system 300, the data collection system 300 may be connected to the data collection system 100 (e.g., via a connection between data interfaces 101 and 302) so that splice data is transferred between the two systems. The data collection system 300 may then be disconnected from the data collection system 100 so that it is more portable. Alternatively, the data collection system 100 may transfer the collected splice data to the storage device 122 so that the data collection system 300 may later retrieve some or all of the splice data stored in the storage device 122.

Figure 4:
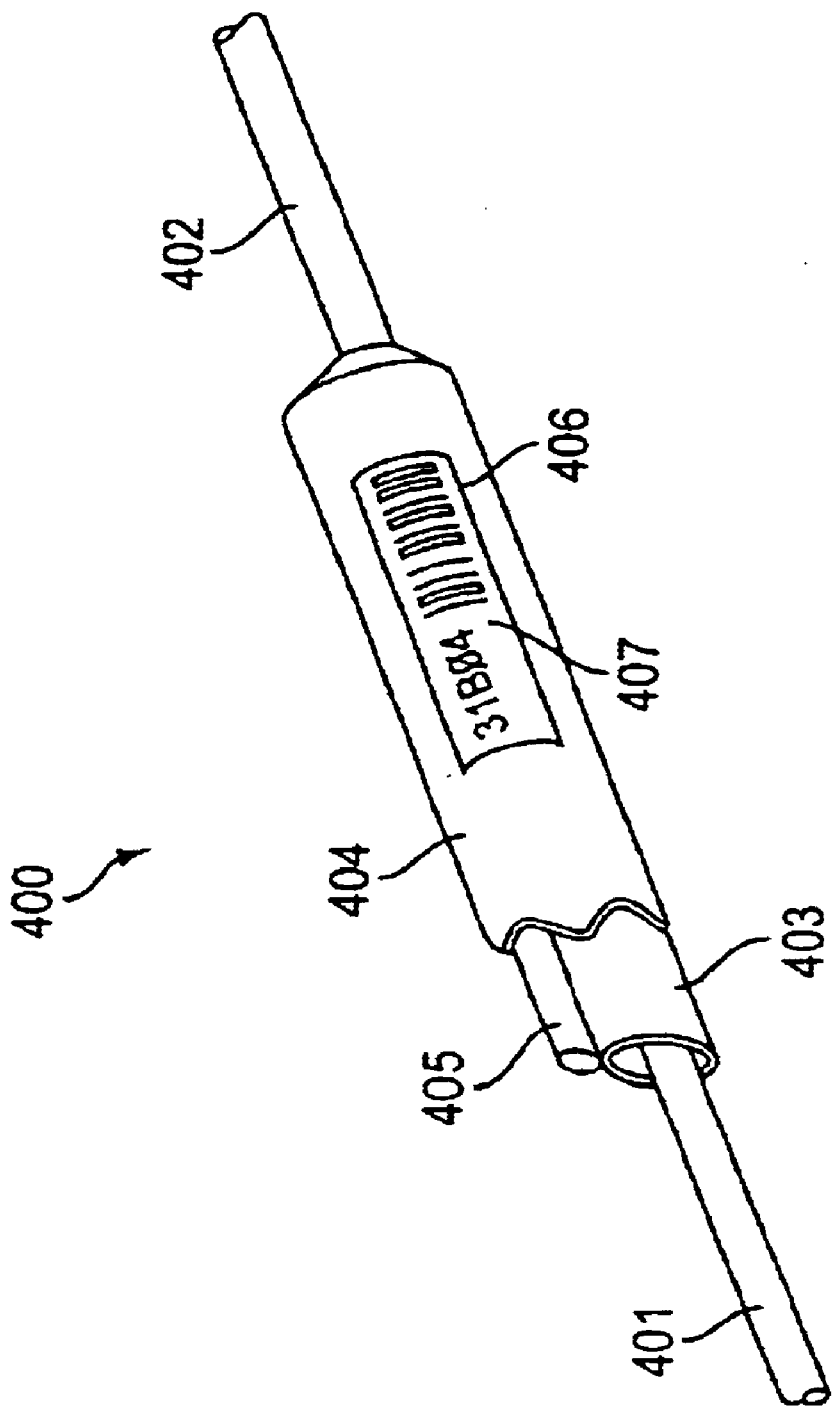
FIG. 4 is a perspective view of an exemplary embodiment of a splice according to aspects of the present invention.

An exemplary embodiment of a splice 400 having a label with a splice-identifying splice indicium is illustrated in FIG. 4. Two or more optical fiber segments 401, 402 may be spliced together using conventional methods such as fusion splicing. The optical fiber segments 401, 402 are typically made up of an optically transmissive core surrounded by a protective cladding. The fusion point, or splice location (e.g., splice location 701 shown in FIG. 7), between the two segments 401,402 may be protected by an inner sleeve 403 (which may be, e.g., thermoplastic tubing) encircling the splice location, and/or an outer sleeve 404 (which may be, e.g., heat shrinkable tubing) encircling the inner sleeve 403. A support rod 405 (which may be made of, e.g., metal, quartz, plastic, and/or a polymer) for absorbing mechanical stresses may be disposed between the inner sleeve 403 and the outer sleeve 404. FIGS. 4–10 show the inner sleeve 403, the outer sleeve 404, and the support rod 405 as being cut away in order to more clearly illustrate the structure of the splice 400.

The splice 400 may also include a label 406 for identifying the particular splice 400. In some embodiments of the present invention, the label 406 may be in the form of, but not limited to, one or more of the following: a strip, foil, pad, sticker, thread, weave, engraving, raised surface feature such as braille, flag, tab, textured surface or object, hologram, electronic memory device such as a micro-chip, and/or any other material, object, and/or device of any shape and/or size suitable for bearing the splice indicium 407. The label 406 may be made of paper, plastic, metal, metal foil, a polymer, liquid, ink, and/or any other suitable natural and/or manmade material. Any of the above features of the label 406 may be used to uniquely identify and distinguish between individual splices and/or groups of splices.

Figure 5:
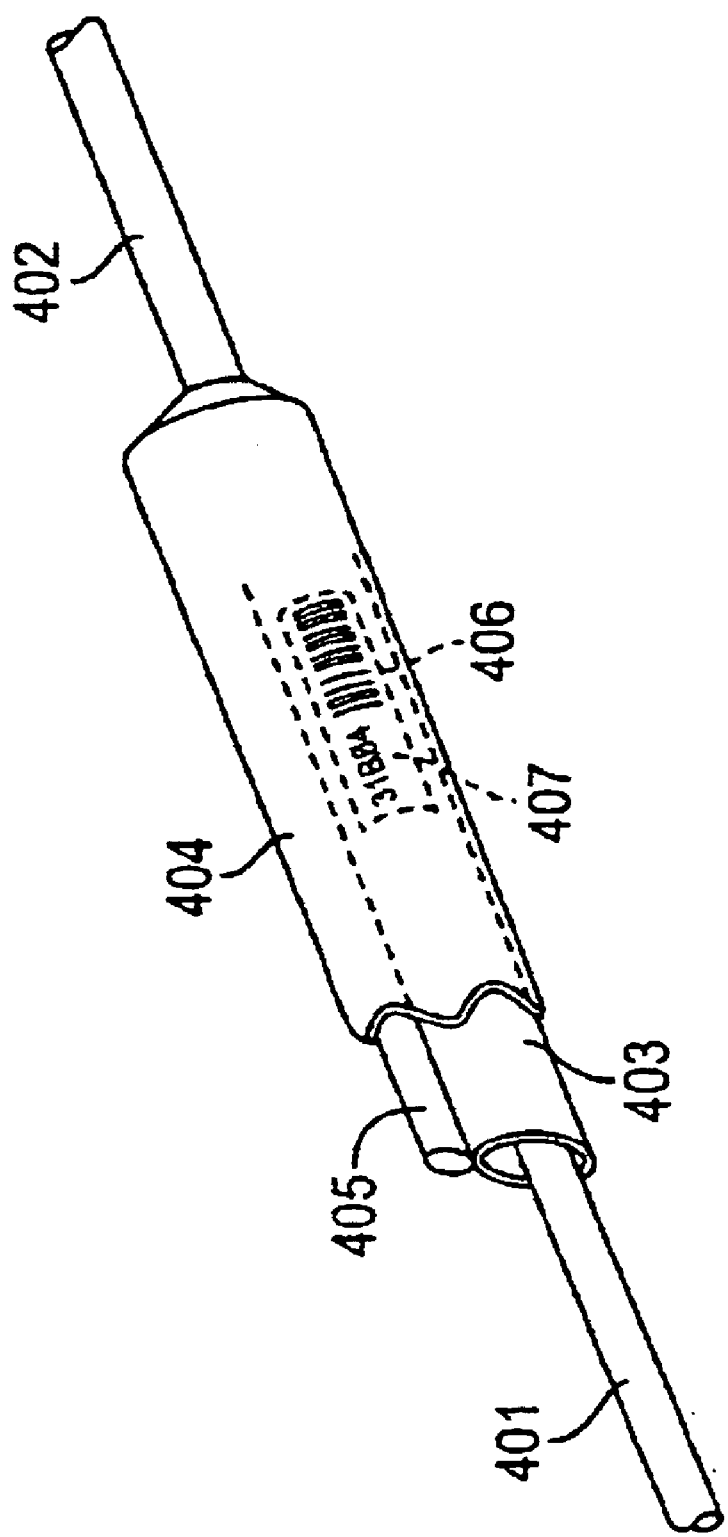
FIG. 5 is a perspective view of another exemplary embodiment of a splice according to aspects of the present invention.

The label 406 may be disposed at a variety of places in/on the splice 400, such as on the outside of, or embedded within, the outer sleeve 404 (as is shown in FIG. 4), between the inner sleeve 403 and the outer sleeve 404, within (and/or part of) the inner sleeve 403, between the inner sleeve 403 and the optical fiber segments 401, 402, on or in the support rod 405, and/or otherwise embedded in the splice 400. For example, FIG. 5 shows the label 406 disposed on the inner sleeve 403 between the inner sleeve 403 and the outer sleeve 404. In such a configuration (i.e., where the label 406 is not on the outside of the outer sleeve 404), the label 406 is protected from damage by at least the outer sleeve 404. Further, the label 406 may be in the form of a sleeve, such as the outer sleeve 404 (indeed, the label may be the outer sleeve 404).

The label 406 may be attached to and/or embedded in any portion of the splice 400 (or other location near the splice) using an adhesive (such as glue and/or epoxy). The adhesive may be separately added between the label 406 and the splice 400, or the adhesive may be part of the pre-made label (such as an adhesive-backed sticker or foil). If the splice 400 is to be submerged in a liquid (e.g., in the ocean), the adhesive preferably should be a waterproof adhesive, and/or the label 406 should preferably not be on the outside of the outer sleeve 404.

The label 406 might not be physically on, or part of, the splice 400 at all, but may be disposed near the splice on, e.g., an optical fiber segment 401 or 402. In general, the label 406 is considered near the splice if it is physically proximate enough to be conveniently identified with the particular splice as opposed to other splices. For example, the label 406 may be disposed at the optical fiber segment 401 within six inches of the splice, within two feet of the splice, or within ten feet of the splice, depending upon the physical environment in which the splice is in. For example, a splice may be in a location that is not easily accessible (such as under water or in a closed container). In such a case, it may be preferable to place the label 406 at a location as near as possible to the splice, e.g., on the optical fiber cable bearing the splice. Alternatively, the label 406 may be disposed at a physical structure supporting, enclosing, and/or near to the splice 400 and/or the optical fiber segment 401 or 402. Another alternative that may be preferably implemented when splices are not easily accessible is to provide a map of the layout of the optical fiber system, wherein the map is labeled, for each splice, with the same information that would be on the label 406. What is important is that the label 406 or map information is configured and located so as to ensure that the label 406 is associated only with a particular splice 400 (or group of splices).

The label 406 may include a splice indicium 407 (or a plurality of splice indicia) that may uniquely identify the splice 400 so as to distinguish the splice 400 from other splices. The splice indicium 407 may be or include, e.g., text, numbers, alphanumeric text, a symbol or symbol combination, bar coding, a pattern, graphics, a shape, a picture, an image, a holographic image, a raised surface feature such as braille, a signature, a trademark, a color or color combination, a marking, an engraving, an icon, a texture, and/or data within an electronic memory device such a micro-chip. As shown in FIG. 4, the exemplary splice indicium 407 is a combination of alphanumeric text ("31B04") and a bar code.

The splice indicium 407 may be disposed on the label 406, or it may be printed and/or etched directly on/in the splice 400 itself (such as on the outer sleeve 404, the inner sleeve 403, the support rod 405, and/or the optical fiber segments 401 and/or 402) without any need for a separate label 406. The splice indicium 407 may be unique for a particular optical fiber system, use, application, location, owner, splice type, splice performance, wavelength of light being used, date and/or time of manufacture and/or installation, splice manufacturer, splice customer, installation and/or purchase contract, and/or age of the splice 400. Further, each splice indicium 407 may be completely unique for each splice amongst all splices that are identified by splice indicia Preferably, the splice indicia should be configured to allow a large number of splices to be made without duplication of splice indicia (e.g., by using an alphanumeric number having a large number of digits, such as at least 5 alphanumeric digits, at least 10 alphanumeric digits, at least 1 million unique splice indicia, or at least 1 billion unique splice indicia).

Preferably, the label and splice indicium should be in both human-readable (e.g., alphanumeric) and machine-readable (e.g., bar-coded) format, such as is shown in FIG. 4. This configuration of splice indicium allows a person to both visually search for a particular splice and to quickly input splice indicia into the data collection device via, e.g., a bar code reader.

The particular embodiment, format, layout, style, and/or content of the label 406 and/or the splice indicium 407 may partially or completely depend upon the use/application, location, owner, splice identity, splice type, splice performance, wavelength of light being used, date and/or time of manufacture and/or installation, splice manufacturer, splice customer, installation and/or purchase contract, and/or age of the splice 400. For example, a particular embodiment, format, layout, style, other content of the label 406 and/or the splice indicium 407, and/or splice indicium prefix or suffix may be reserved only for government use (e.g., a prefix of "31" such as is shown in the first two indicia of FIG. 2 may indicate government use).

The label 406 and/or splice indicium 407 may include splice information. For example, the splice indicium 407 may include text, symbols, and/or other features indicating the estimated loss of the splice, the cleave angle of the splice, the date/time of manufacture of the splice, the operator who created the splice, the identity of the splicer that created the splice (including the splicer's manufacturer serial number), the installation location of the splice, and/or any cross-referenced splices.

Security is also a factor in deciding the configuration for a label 406 and a splice indicium 407. It is preferable that the label 406 and/or the splice indicium 407 be damaged or destroyed upon tampering with the splice or the label (a "tamper-proof" label). For example, a holographic image may be used a the splice indicium, and may be adhesively disposed between the inner sleeve 403 and the outer sleeve 404 such that when the splice is opened, the holographic image is damaged or destroyed. Any feature of the indicium 407 may be holographic. For example, a serial number, alphanumeric test, and/or bar code may be holographically etched. Further, the hologram may be a trademark of the manufacturer, customer, and/or project in which the splice will be used. Such features discourage tampering with or sabotaging a splice, since such unauthorized tampering would be apparent upon inspection of the splice. For similar reasons, it is preferable that the label 406 and/or the splice indicium 407 be difficult to counterfeit in order to prevent creation of unauthorized and counterfeit labels.

Figure 6:
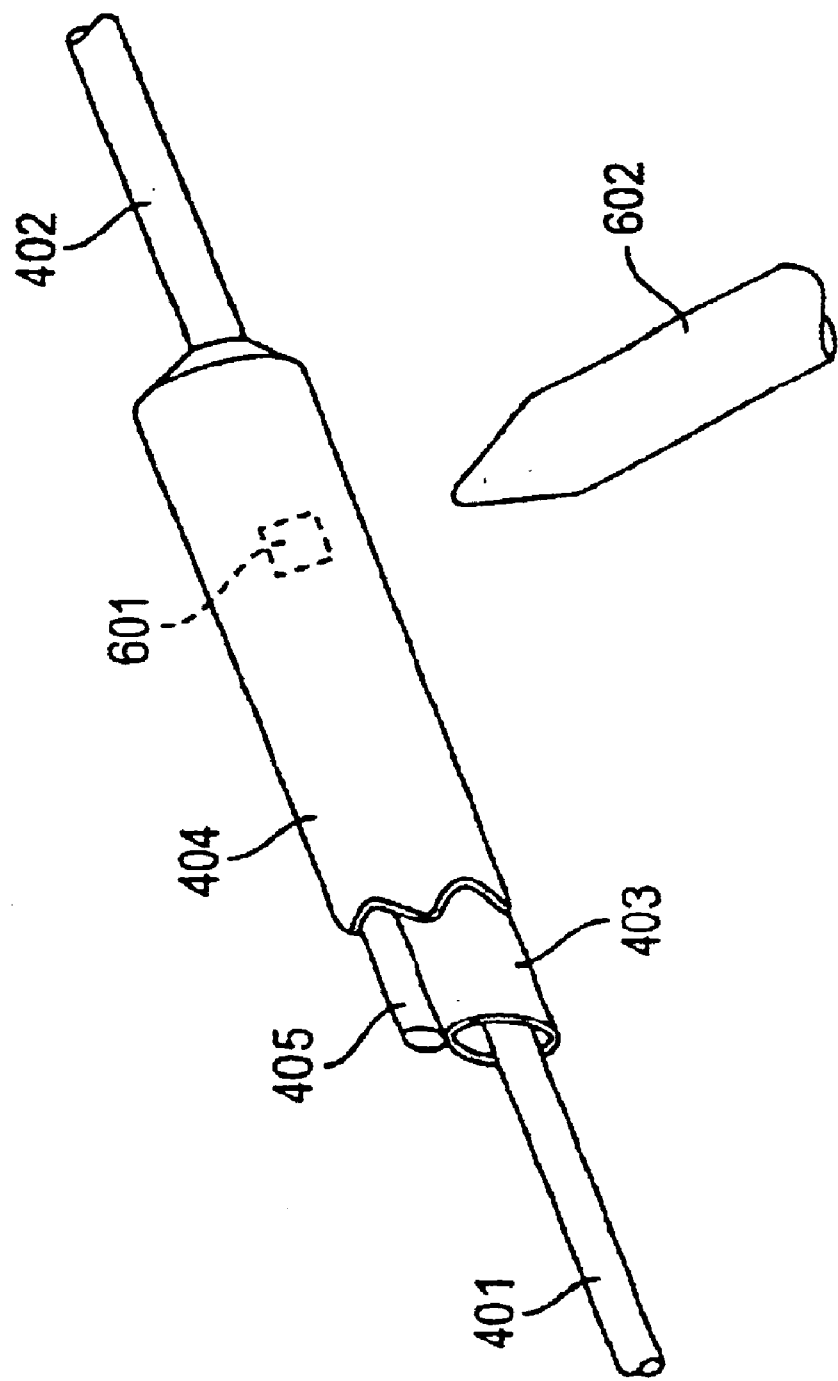
FIG. 6 is a perspective view of another exemplary embodiment of a splice according to aspects of the present invention.

In still further embodiments of the present invention such as is shown in FIG. 6, the label 406 may be and/or include an electronic memory device 601, such as a micro-chip having a memory, and/or other similar electronic device. The electronic memory device 601 may store data representing the splice indicium 407 (or plurality of splice indicia), and such data representing the splice indicium 407 may be electronically detectable using a type of device such as a well-known probe 602 for reading data from the memory of the electronic memory device 601. The electronic memory device 601 may be provided with memory capable of storing some or all of the data that may be stored in the data storage device 102 of the data collection system 100 and/or the data storage device 122. In such an arrangement, the electronic memory device 601 may transmit some or all of the data stored in its memory responsive to an electronic probe 602 activating the electronic memory device 601. The electronic memory device 601 may be disposed on or embedded in any portion of the splice that the label 406 may be as described above.

In another arrangement, the electronic memory device 601 may also store the splice data associated with the splice. For example, splice no. 31B04 may have an electronic memory device 601 embedded within the splice, the electronic memory device 601 having a memory containing the exemplary splice data for splice no. 31B04 as shown in FIG. 2. In such embodiments, the data collection system 300 would not need to store the splice data (although it may still be configured to do so), but instead could merely read the splice data via the electronic probe 602 and display the data to the user. Such embodiments allow for an even more portable data collection system 300, since the memory 305 and/or any other storage device may be made even smaller.

Various types of devices are known that could be used as the electronic memory device 601. For example, Dallas Semiconductor markets a DS1990A "Serial Number iButton." Another example is the Dallas Semiconductor DS1996 "64 Kbit Memory iButton." Both of these products work with the Dallas Semiconductor DS9092 "iButton Probe," which may be used as the electronic probe 602.

Figure 7:
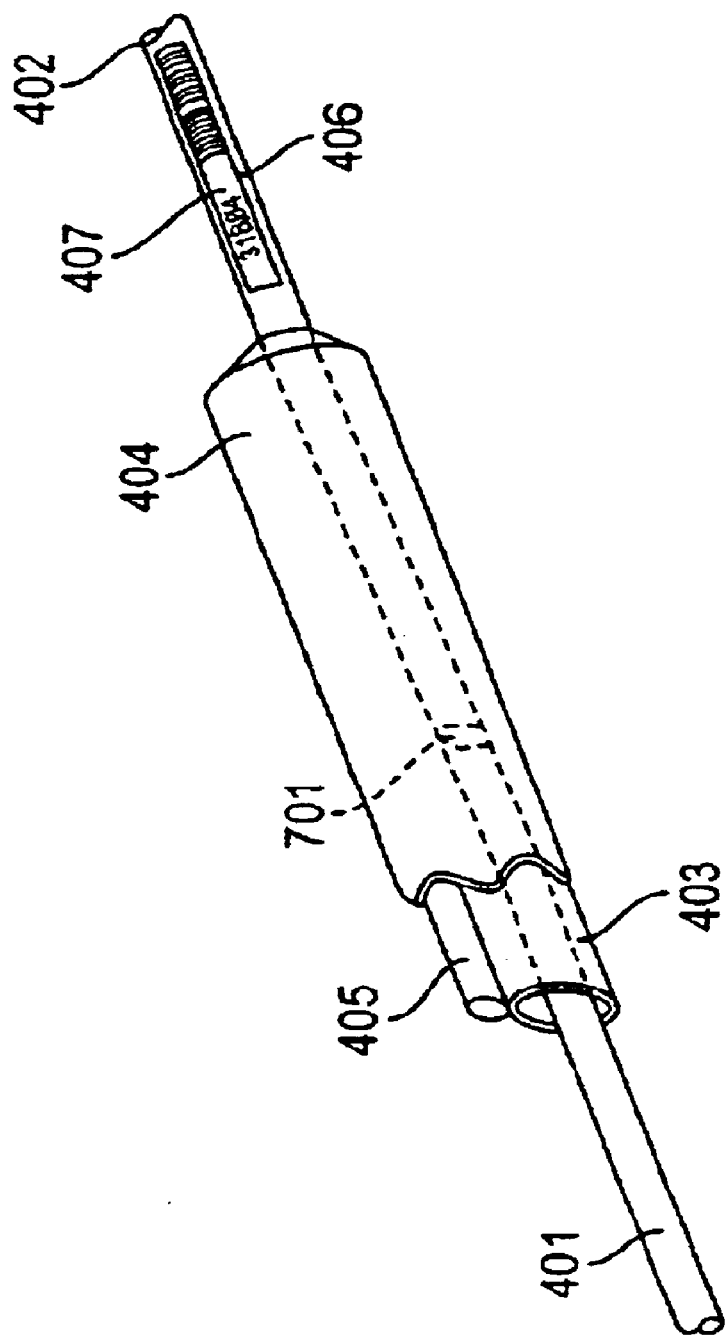
FIG. 7 is a perspective view of another exemplary embodiment of a splice according to aspects of the present invention.

In still further embodiments of the present invention such as is shown in FIG. 7, the label 406 and/or the indicium 407 may be disposed at one or more of the optical fiber segments 401, 402. For example, as shown in the exemplary embodiment of FIG. 7, the label 406 bearing the indicium 407 may be attached to the surface of optical fiber segment 402. FIG. 7 also shows an exemplary embodiment of a splice location 701 where the optical fiber segments 401, 402 are spliced together. As discussed above, the label 406 and/or the indicium 407 may be located adjacent to the splice, near the splice, and/or at any distance from the splice that is appropriate for the particular use of the splice.

Figure 8:
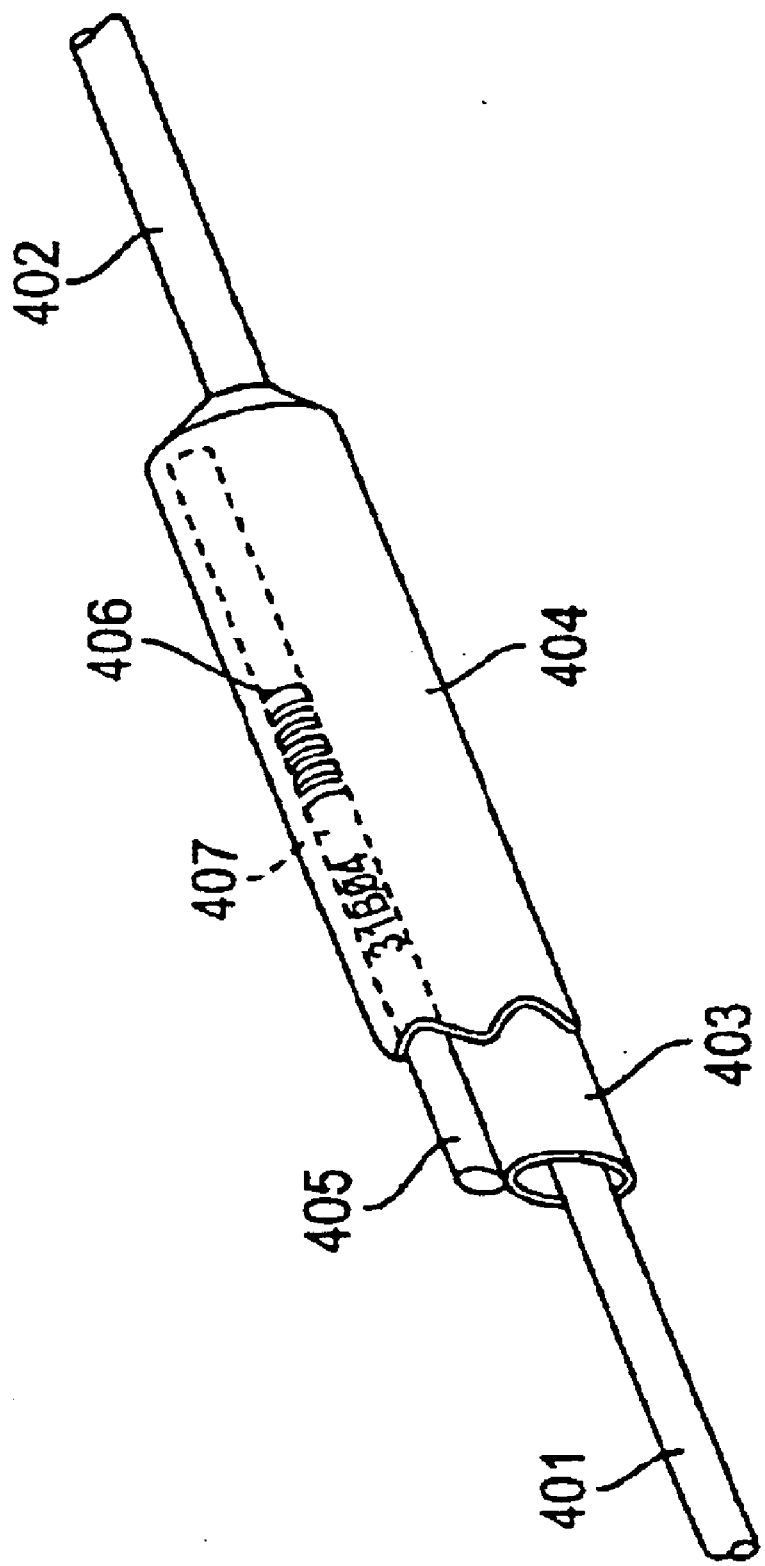
FIG. 8 is a perspective view of another exemplary embodiment of a splice according to aspects of the present invention.

In still further embodiments of the present invention such as is shown in FIG. 8, the label 406 and/or the indicium 407 may be disposed at the support rod 405. For example, as shown in the exemplary embodiment of FIG. 8, the label 406 bearing the indicium 407 may be attached to the support rod 405.

Figure 9:
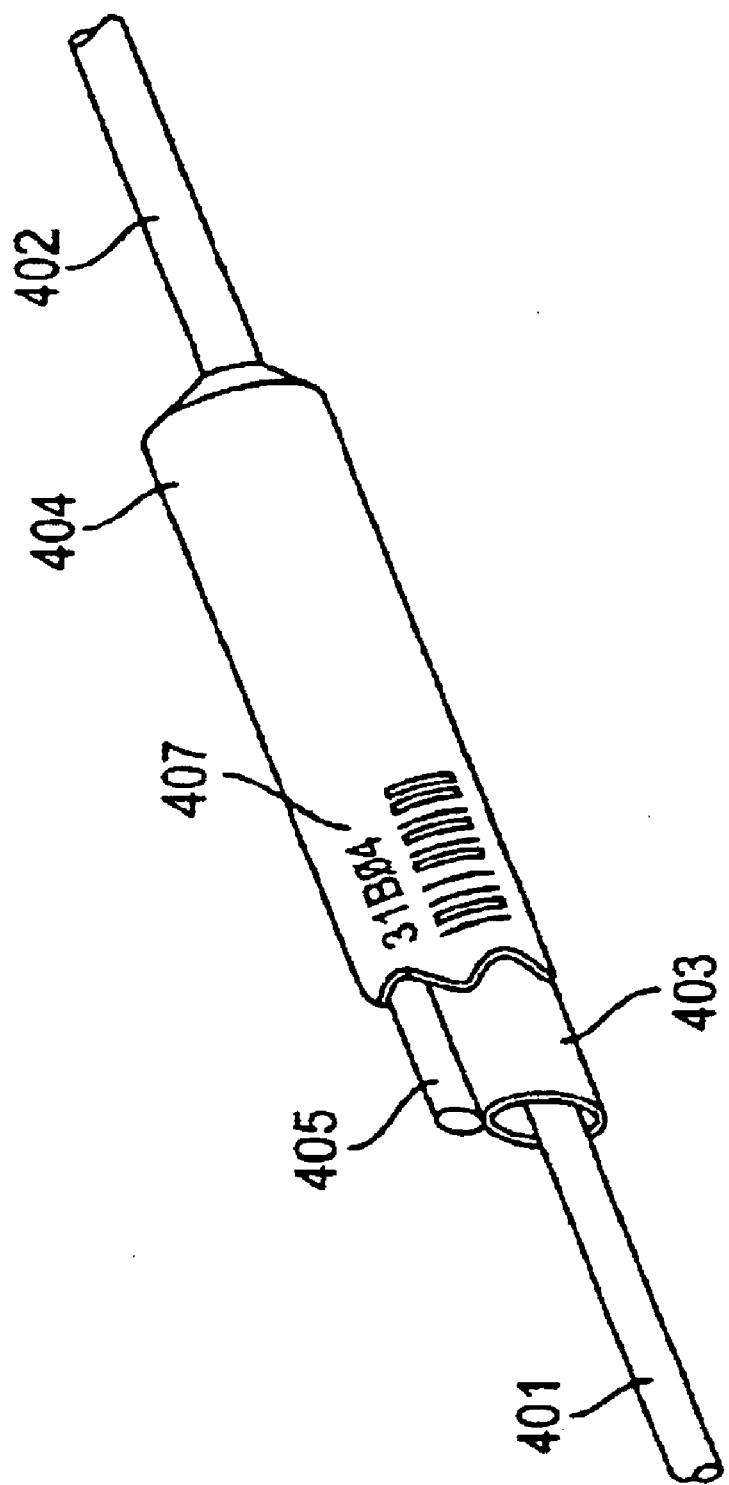
FIG. 9 is a perspective view of another exemplary embodiment of a splice according to aspects of the present invention.

In still further embodiments of the present invention such as is shown in FIG. 9, the label 406 may be a sleeve. For example, as shown in the exemplary embodiment of FIG. 9, the label 406 may be the outer sleeve 404. Alternatively, the label 406 may be the inner sleeve or any other sleeve.

Figure 10:
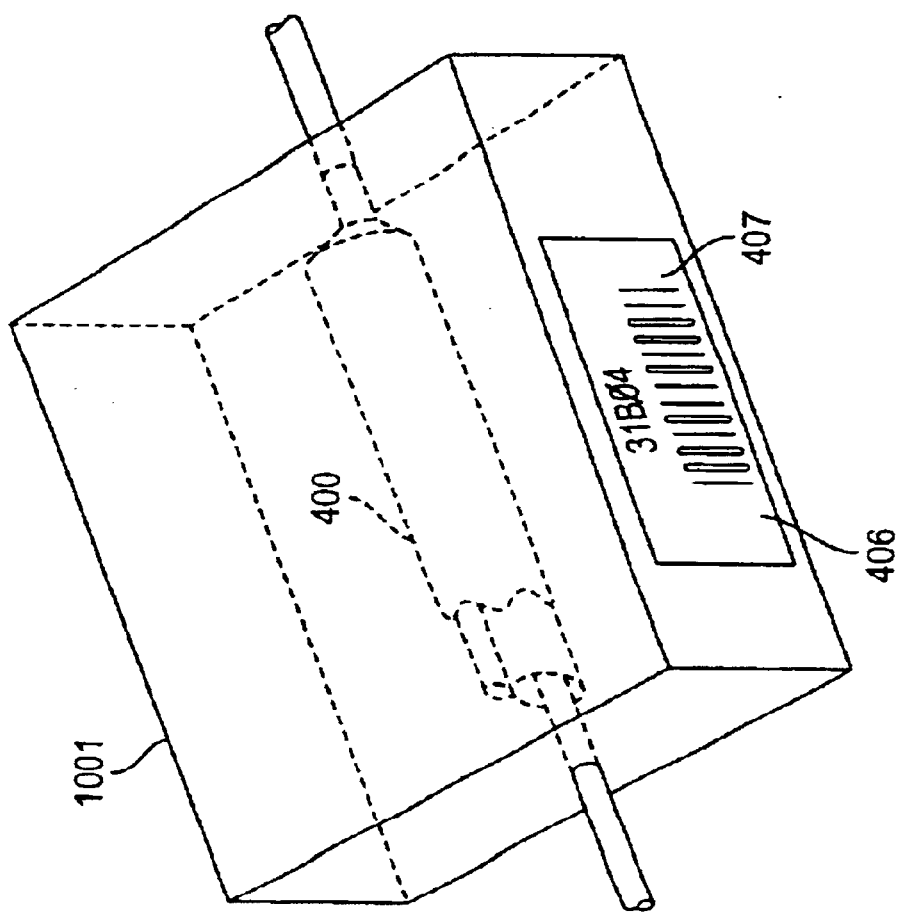
FIG. 10 is a perspective view of another exemplary embodiment of a splice according to aspects of the present invention.

In still further embodiments of the present invention such as is shown in FIG. 10, the splice 400 may be located within a sealed container and/or in another location that is difficult to access. In such embodiments, the label 406 and/or the indicium 407 may be disposed at another location related to the splice 400, but preferably adjacent to the splice 400. For example, as shown in the exemplary embodiment of FIG. 10, the label 406 bearing the indicium 407 may be attached to the outside of a container 1001 containing the splice 400.

When splices are identified using labels and/or splice indicia as discussed above, a user of the data collection system of the present invention may trace back the source of manufacture of a particular splice, as well as other splice data. For example, a user who finds a defective splice that is installed in an optical fiber system may manually read the splice indicium located on the defective splice (and/or read the splice indicium using, e.g., the bar code reader 301 or other input device 308), manually or automatically input the splice indicium into the data collection system (e.g., data collection system 300), and view splice data associated with and indexed by the splice indicium. Thus, the user may view on the display 304 the splice image data to determine whether the splice was incorrectly manufactured or whether the splice was later damaged. The user may further determine who created the splice, on what splicer the splice was created, when the splice was created, the estimated optical loss of the splice, etc.

In further embodiments of the present invention, a user may utilize the data collection system 100 and/or 300 to determine any related splices that are cross-referenced in the splice data. For example, referring to the exemplary splice data shown in FIG. 2, the user may input splice no. 23A17 into the data collection system, whereupon the data collection system may output cross-reference splice nos. 23A15, 23A16, and 23A18. When the cross-referenced splice numbers are, e.g., on the same optical fiber cable, such a method for using the data collection system can assist the user in troubleshooting splice problems. This is because the user may be apprised of all of the splices on a particular faulty optical fiber cable.

Thus, embodiments of the data collection system and the uniquely-identified splices as described above allows a user of the system to collect and store splice data and splice indicia during the manufacture of splices, and/or to provide accountability as to the source of a particular splice and/or as to the cause of a defect in a particular splice.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

I claim:

1. A method for retrieving splice data for a splice from a subset of splices, the method comprising the steps of:

selecting the subset of splices from a larger set of available splices, the subset including a first splice;

transferring a pre-stored plurality of splice indicia associated with the subset of splices, and splice data associated therewith, to a first storage device;

reading a first splice indicium from the first splice;

comparing the first splice indicium with the plurality of splice indicia stored in the first storage device; and retrieving splice data from the first storage device associated with the first splice indicium.

2. The method of claim 1, wherein the step of transferring includes transferring the pre-stored plurality of splice indicia and associated splice data from a second storage device to the first storage device, the method comprising the further step of uncoupling the first storage device from the second storage device prior to reading the first splice indicium.

3. The method of claim 1, wherein the set of available splices are associated with a plurality of optical fiber systems, and the subset of splices are all associated with a same optical system.

* * * * *